UNITED STATES PATENT OFFICE.

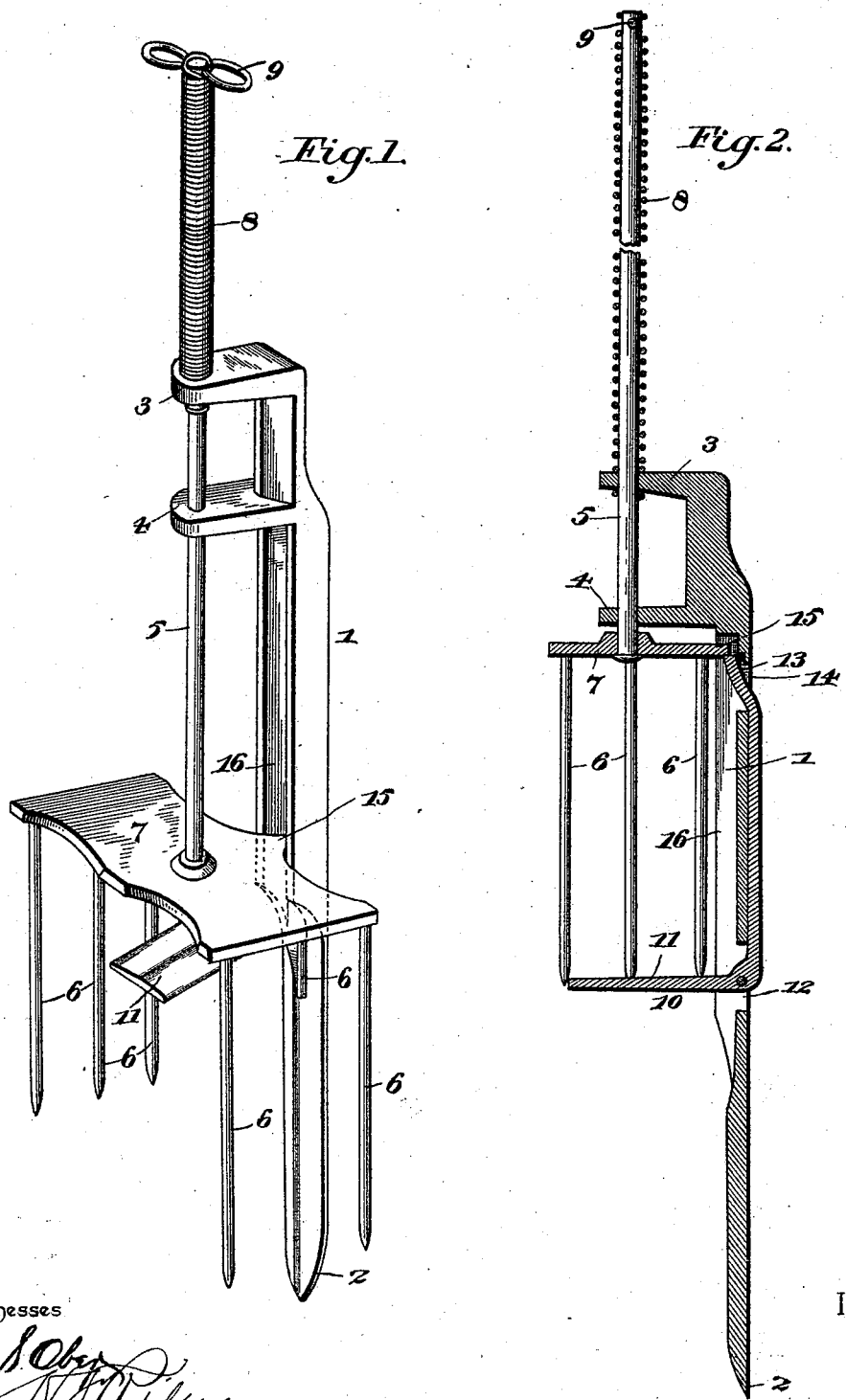

MARSHALL E. PARHAM, OF BURR OAK, MICHIGAN.

MOLE-TRAP.

SPECIFICATION forming part of Letters Patent No. 517,824, dated April 3, 1894.

Application filed May 20, 1893. Renewed March 6, 1894. Serial No. 502,594. (No model.)

*To all whom it may concern:*

Be it known that I, MARSHALL E. PARHAM, a citizen of the United States, residing at Burr Oak, in the county of St. Joseph and State of Michigan, have invented a new and useful Mole-Trap, of which the following is a specification.

The invention relates to improvements in mole traps.

The object of the present invention is to provide a simple, inexpensive and efficient mole trap, which will be strong and durable, and which may be readily placed in operative position over a mole run, and which will be exceedingly sensitive and quickly sprung by a mole passing through the run.

The invention consists in the construction and novel combination and arrangement of parts hereinafter fully described, illustrated in the accompanying drawings and pointed out in the claim hereto appended.

In the drawings—Figure 1 is a perspective view of a mole trap constructed in accordance with this invention. Fig. 2 is a vertical longitudinal sectional view.

Like numerals of reference indicate corresponding parts in both the figures of the drawings.

1 designates a standard provided at its lower end with a point 2, adapted to be inserted into the ground and having at its upper end horizontal forwardly extending arms 3 and 4, in openings of which is mounted a spring actuated plunger 5, carrying at its lower end pins 6 for impaling a mole. The plunger has secured to its lower end a horizontal plate 7 from the ends of which depend the pins 6; and the latter are arranged in rows and extend transversely of a mole run. The upper portion of the plunger has disposed on it a closely coiled spiral spring 8, having its upper end attached to the plunger by a key 9, and its lower end connected to the arm 3 of the standard. The key 9 is preferably arranged between the top coils of the spring, and the bottom coil is located below the arm, as this forms very simple means for attaching the spring.

The plunger is held elevated for setting the trap by a bell-crank lever 10, having a horizontal arm 11 forming a trigger and flattened and adapted to rest upon the ground over a mole run. The bell-crank lever is fulcrumed at its angle in an opening 12 of the standard, and its vertical arm extends upward along the standard at the back thereof, and has its upper end 13 bent forward and extending through an upper opening 14 of the standard, to engage a projection 15 of the plate 7. The projection 15 of the plate 7 is arranged in a longitudinal groove 16 of the standard to guide the plate and prevent the same and the plunger turning; and the groove is formed in the front of the standard.

The trap is arranged over a mole run, and the lower end or point of the standard is inserted into the ground at one side of the run a depth sufficient to bring the trigger 11 upon the surface of the ground which is slightly depressed. The trap is then set by raising the plunger, against the action of the spiral spring, until the projection 15 is engaged by the upper end 13 of the bell-crank lever. A mole passing through the run will lift the depressed portion of the run and raise the trigger and spring the trap.

It will be seen that the trap is simple and inexpensive in construction, and positive and reliable in operation, and that it may be readily placed in operative position over a mole run.

Changes in the form, proportion and the minor details of construction may be resorted to without departing from the principle or sacrificing any of the advantages of this invention.

What I claim is—

In a mole trap, the combination of a standard having a point at its lower end, and arms at its upper end and provided with a longitudinal groove and having openings at the upper and lower ends of the groove, a plunger mounted in the openings of the arms, a spring for forcing the plunger downward, a plate secured to the lower end of the plunger and having depending pins and provided with a projection arranged in said groove, a bell-crank lever fulcrumed at its angle in the lower opening and having one arm arranged horizontally and forming a trigger, and its other arm disposed vertically on the back of the standard and having its upper end bent forward and extending through the upper opening for engaging the projection of the plate, substantially as described.

In testimony that I claim the foregoing as my own I have hereto affixed my signature in the presence of two witnesses.

MARSHALL E. PARHAM.

Witnesses:
 JAY J. STANTON,
 ROSWELL WILCOX, Jr.